United States Patent [19]

Niggemann

[11] Patent Number: 4,786,015
[45] Date of Patent: Nov. 22, 1988

[54] STRUCTURAL COOLING UNIT

[75] Inventor: Richard E. Niggemann, Rockford, Ill.

[73] Assignee: Sundstrand Corporation, Rockford, Ill.

[21] Appl. No.: 948,109

[22] Filed: Dec. 31, 1986

[51] Int. Cl.[4] .............................................. B64C 1/38
[52] U.S. Cl. ................................. 244/117 A; 244/57; 244/123; 165/169; 165/184
[58] Field of Search .............. 244/117 A, 117 R, 119, 244/57, 123; 165/169, 41, 184

[56] References Cited

U.S. PATENT DOCUMENTS

| | | | |
|---|---|---|---|
| 1,483,442 | 2/1924 | Hobart | 165/169 |
| 1,949,787 | 3/1934 | Dugan | 244/119 |
| 2,166,188 | 7/1939 | Turner | 165/169 |
| 2,351,152 | 6/1944 | Schick | 244/119 |
| 2,578,550 | 12/1951 | Holm et al. | 165/184 |
| 2,762,419 | 9/1956 | Prewitt | 244/119 |
| 2,817,484 | 12/1957 | Stenzel | 244/119 |
| 2,941,759 | 6/1960 | Rice et al. | |
| 3,086,358 | 4/1963 | Tumavicus | |
| 3,103,885 | 9/1963 | McLauchlan | |
| 3,129,754 | 4/1964 | Menzel | 244/117 A |
| 3,163,210 | 12/1964 | Horrocks | 165/184 |
| 3,369,782 | 2/1968 | Billig et al. | |
| 3,690,103 | 9/1972 | Dederra et al. | |
| 3,692,637 | 9/1972 | Dederra et al. | |
| 3,977,206 | 8/1976 | Simmons | |
| 4,133,376 | 1/1979 | Ellenberg et al. | |
| 4,185,558 | 1/1980 | Quinville | |
| 4,552,724 | 11/1985 | Matsumoto et al. | 165/169 |

FOREIGN PATENT DOCUMENTS

| | | | |
|---|---|---|---|
| 3034565 | 4/1982 | Fed. Rep. of Germany | 165/169 |
| 794660 | 5/1958 | United Kingdom | 165/169 |

OTHER PUBLICATIONS

Niblock et al., "Four Space Shuttle Wing Leading Edge Concepts", *J. Spacecraft*, May 1974, vol. 11, No. 5. pp. 314–320.

*Primary Examiner*—Galen L. Barefoot
*Attorney, Agent, or Firm*—Wood, Dalton, Phillips, Mason & Rowe

[57] ABSTRACT

In order to dissipate aerodynamic heating in hypersonic aircraft, while at the same time providing structural support for the leading edge of an airfoil or the nose cone in a manner that avoids transmittal of thermal bending loads into the aircraft, a structural cooling unit is formed of a load bearing structure. The load bearing structure is of hollow construction defining a fluid flow path therethrough and has a fluid inlet at one end of the fluid flow path and a fluid outlet at the other end of the fluid flow path which comprises a tortuous path through the load bearing structure. Additionally, for purposes of forming a structural load path, the load bearing structure is formed into an elongated tubular configuration having at least one substantially continuous heat exchanging surface for aerodynamic heat dissipation.

25 Claims, 3 Drawing Sheets

STRUCTURAL COOLING UNIT

FIELD OF THE INVENTION

This invention relates to a structural cooling unit and, more particularly, to an aircraft leading edge and/or nose cone having an active structural cooling unit.

BACKGROUND OF THE INVENTION

In the case of hypersonic aircraft, the nose cones and leading edges of aerodynamic surfaces are subject to intense non-uniform atmospheric heating. The peak heating rate occurs at the stagnation point of flow with respect to the leading edge and decreases to a modest fraction of the peak flux at 90 degrees from the stagnation point, assuming the leading edge is a circular arc. Ablative cooling is the usual process utilized in present reentry vehicles, such as the Space Shuttle, to avoid the otherwise dangerous problem of overheating. The extreme heating during reentry is conventionally radiated to space by means of insulating tiles that are surface affixed with consequent limitations in the heating rates due to the maximum temperatures that can be withstood by the tiles. To compensate for the limited peak temperatures and, thus, limited heating rates of the insulating tiles, the Space Shuttle must reenter the earth's atmosphere at a large angle of attack.

For some missions envisioned for transatmospheric hypersonic vehicles, the radar signature associated with reentering at a large angle of attack may limit the mission effectiveness. Also, current mission scenarios envision multiple missions per day for such vehicles. Since the current history of insulating tile protection systems appears incompatible for multiple mission applications, there is a desire to investigate the possibility of utilizing active cooling to dissipate the heating on hypersonic vehicle leading edges and nose cones.

While the actual manner of successfully-utilizing active cooling has been unknown, it has been recognized that active cooling must take into account factors of critical importance. These include the capability of handling the circumferential variability of the heat flux; the fact that the angle of attack may change and cause the location of the highest heating rate to change on the circumference; the fact that there will be high intensity heating during acceleration to peak altitudes which, if vaporization of a working fluid is utilized, will have a tendency to blanket the leading edge surface with vapor since the acceleration field will be such that it will tend to urge the heavier liquid component away from the leading edge surface; and the fact that the peak intensities of heat flux are such that large temperature gradients across the wall comprising the leading edge may occur. In addition to factors of this type, it is generally recognized that the thermal stresses in the vehicle structure may limit the actual number of operating cycles that can satisfactorily be sustained by the vehicle.

Among the attempts to overcome the problems of aerodynamic heating is that disclosed in Billig et al U.S. Pat. No. 3,369,782. It is there proposed to provide an internally cooled leading edge structure for hypersonic vehicles in the form of a plurality of stainless steel tubes that are aligned in parallel relationship and bonded together with the corner portions of the tubes being aligned in clusters which are disposed in generally vertical planes perpendicular to the bonded portion of the tubes. With this arrangement, a coating of metal is electroformed over the tubes to form an aerodynamic wedge-shaped structure to be attached to the main body of a hypersonic airfoil.

Rice et al U.S. Pat. No. 2,941,759 discloses a heat exchanger construction of a very different type having porous walls and utilizes a coolant fluid which is uniformly distributed. The flow of the coolant fluid may be controlled and, if desired, completely dammed in selected areas. For this purpose, a cellular core which separates a porous skin and an inner sheet serves as a fluid conductor to provide fluid under pressure at defined, localized areas of the skin.

Still other heat exchange proposals include the rocket nozzle construction disclosed in Tumavicus U.S. Pat. No. 3,086,358, and the method of fabricating hollow structures having cooling channels disclosed in Dederra et al U.S. Pat. Nos. 3,690,103 and 3,692,637, as well as the methyl cooling system disclosed in McLauchlan U.S. Pat. No. 3,103,885.

Despite these attempts to provide a cooling unit, it has remained to successfully accomplish the objective of satisfactorily cooling a nose cone or a leading edge in a manner that avoids transmittal of thermal bending loads. Accordingly, the present invention is directed to overcoming the above-stated problems and accomplishing the stated objects by providing an active structural cooling unit for an aircraft leading edge or nose cone.

SUMMARY OF THE INVENTION

With this background, the present invention is directed to a structural cooling unit. The unit includes a load bearing structure of hollow construction defining a fluid flow path therethrough. The load bearing structure has a fluid inlet at one end of the fluid flow path and a fluid outlet at the other end of the fluid flow path and is formed into an elongated tubular configuration having at least one substantially continuous heat exchanging surface. Additionally, the unit is formed such that the fluid flow path comprises a tortuous path through the load bearing structure.

In an exemplary embodiment, the unit includes a hollow metal tube having an inlet at one end and an outlet at the other end. The hollow metal tube is defined by spaced generally parallel bottom and top walls joined by a pair of spaced side walls. The unit is formed by helically winding the hollow metal tube into an elongated tubular configuration. Additionally, the helically wound metal tube has a continuous inner heat exchanging surface defined by the bottom wall with adjacent edges of the bottom wall being in abutting relationship In the exemplary embodiment, the helically wound metal tube has a substantially continuous outer heat exchanging surface defined by the top wall with adjacent edges of the top wall being in slightly spaced relationship. The hollow metal tube is then advantageously formed with the side walls slightly tapering from the bottom wall to the top wall such that adjacent side walls define a narrow helically extending V-shaped gap between the inner heat exchanging surface of the outer heat exchanging surface of the helically wound metal tube. Preferably, a compliant filler material is provided in the narrow helically extending V-shaped gap in the helically wound metal tube to accommodate thermal growth during heating of the outer heat exchanging surface thereof.

In geometric terms, the elongated tubular configuration into which the hollow metal tube is helically wound is preferably either generally cylindrical or generally oblong. It will also be appreciated that the hollow metal tube is advantageously trapezoidal in cross-section with the bottom wall being slightly greater in width than the top wall and the side walls converging slightly from the inner heat exchanging surface to the outer heat exchanging surface of the helically wound metal tube. When so formed, the adjacent edges of the bottom wall can be welded to secure them in integral relationship after which the compliant filler material can be placed in the narrow V-shaped helically extending gap.

In a preferred embodiment of the invention, an aircraft leading edge having an active structural cooling unit is provided. It will be appreciated that the generally parallel bottom and top walls together with the spaced side walls define a coolant flow channel which, after the hollow metal tube has been helically wound, extends helically between the inlet and the outlet. With this arrangement, the inlet is disposed at one end and the outlet is disposed at the other end of the elongated tubular configuration.

As previously suggested, the adjacent edges of the bottom wall are preferably secured in integral relationship by welding or the like. This is done to form a structural load path through the elongated tubular configuration capable of avoiding the transmittal of thermal bending loads into the aircraft or vehicle. In other words, the thermal bending loads are carried by the elongated tubular configuration of the helically wound metal tube.

In the preferred embodiment, the aircraft leading edge includes a tank for storing coolant in close proximity to the inlet and outlet. It also advantageously includes means for circulating coolant from the tank to the inlet, through the coolant flow channel, and from the outlet back to the tank. Moreover, the aircraft preferably includes an external skin covering the elongated tubular configuration in heat exchange relationship therewith.

In a preferred embodiment of the invention, the aircraft leading edge includes a plurality of the helically wound metal tubes. Each of the helically wound metal tubes is then advantageously provided with an inlet and an outlet at opposite ends thereof and the respective elongated tubular configurations defined by the helically wound metal tubes are disposed in longitudinally extending adjacent relationship. Moreover, the inlet of any one of the helically wound metal tubes is preferably disposed at the end thereof closest the outlet of the next adjacent of the helically wound metal tubes.

With this arrangement, an inlet header is preferably provided in communication with the tank and each of the inlets and an outlet header is preferably provided in communication with the tank and each of the outlets of the helically wound metal tubes. The coolant circulating means is then advantageously a pump in communication with the tank and the coolant flow channels in the respective helically wound metal tubes through one or the other of the inlet and outlet headers. Additionally, in order to form a single structural load path through the respective helically wound metal tubes, means are provided for securing each of the helically wound metal tubes to the next adjacent of the helically wound metal tubes in integral relationship.

In an alternative embodiment, the load bearing structure is defined by at least two hollow metal tubes each having spaced generally parallel bottom and top walls joined by a pair of spaced side walls. The hollow metal tubes are helically wound in side-by-side relation into the elongated tubular configuration to have an inner surface defined by the bottom walls forming the substantially continuous heat exchanging surface. Further, each of the hollow metal tubes defines a fluid flow path therethrough and has a fluid inlet at one end thereof and a fluid outlet at the other end thereof.

Other alternative embodiments include the elongated tubular configuration having a first diameter at one end and a second diameter at the other end so as to be generally frustoconically shaped for use in a nose cone. It is also contemplated that the load bearing structure may include a pair of concentric hollow metal tubes disposed in radially spaced relation to define inner and outer heat exchanging surfaces with a helical vane extending between the hollow metal tubes to define the fluid flow path. Further, the present invention can have the load bearing structure defined by a plurality of hollow metal tubes twisted in corkscrew fashion to form the elongated tubular configuration.

Still other objects, advantages and features of the present invention will become apparent from a consideration of the following specification taken in conjunction with the accompanying drawings.

DETAILED DESCRIPTION OF THE PREFERRED EMBODIMENTS

Figure 1:
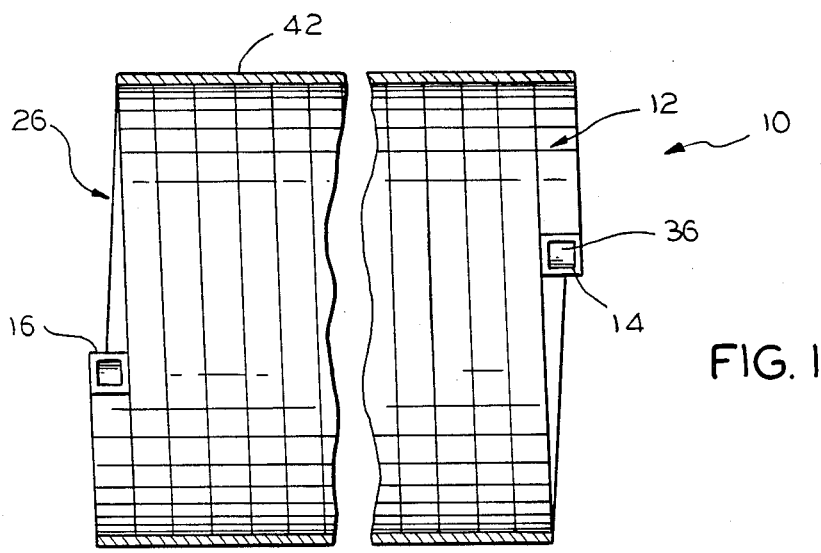
FIG. 1 is a rear elevational view, partially in section, of an aircraft leading edge having an active structural cooling unit in accordance with the present invention.
Figure 2:
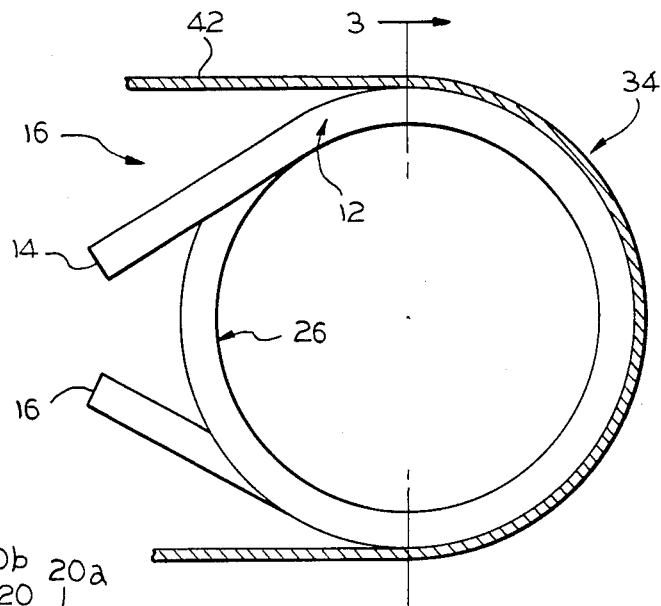
FIG. 2 is an end elevational view, partially in section, illustrating the aircraft leading edge in accordance with FIG. 1.
Figure 3:
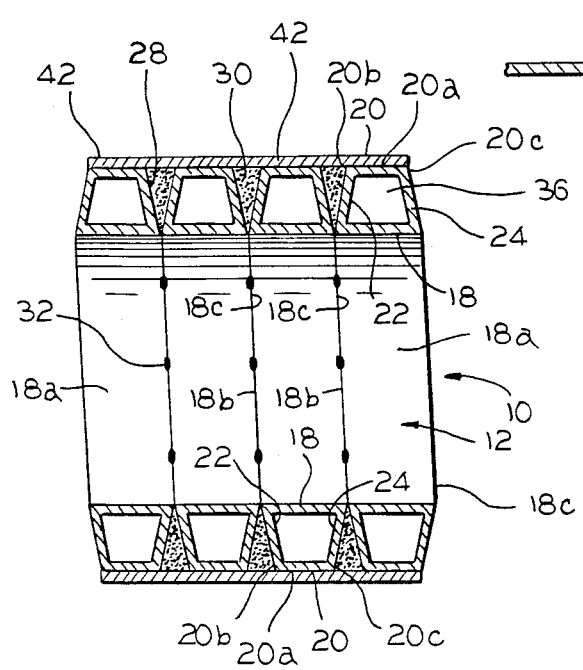
FIG. 3 is a cross-sectional view taken on the line 3—3 of FIG. 2.

An exemplary embodiment of a structural cooling unit in accordance with the invention is illustrated in FIGS. 1–3. The cooling unit 10 includes a hollow metal tube 12 having an inlet 14 at one end and an outlet 16 at the other end. The hollow metal tube 12 is defined by spaced generally parallel bottom and top walls 18 and 20, respectively (see FIG. 3), joined by a pair of spaced side walls 22 and 24, respectively, and the hollow metal tube is helically wound into an elongated tubular configuration generally designated 26. The elongated tubular configuration 26 has a continuous inner heat exchanging surface 18a defined by the bottom wall 18 which has adjacent edges 18b and 18c in abutting relationship. The cooling unit 10 also includes means for securing the adjacent edges 18b and 18c of the bottom wall 18 in integral relationship, as will be described hereinafter.

Still referring to FIGS. 1–3, the elongated tubular configuration 26 defined by the helically wound metal tube 12 has a substantially continuous outer heat exchanging surface 20a defined by the top wall 20 and has adjacent edges 20b and 20c of the top wall 20 in slightly spaced relationship. The elongated tubular configuration 26 is formed with the side walls 22 and 24 slightly tapering from the bottom wall 18 to the top wall 20 such that adjacent side walls 22 and 24 define a narrow helically extending V-shaped gap 28 between the inner heat exchanging surface 18a and the outer heat exchanging surface 20a. As will be appreciated by referring in particular to FIG. 3, a compliant filler material 30 is provided in the narrow helically extending V-shaped gap 28 to accommodate thermal growth during heating of the outer heat exchanging surface 20a of the elongated tubular configuration 26.

As previously mentioned, the cooling unit 10 includes means for securing the adjacent edges 18b and 18c of the bottom wall 18 in integral relationship so as to form a structural load path through the elongated tubular configuration 26. This is preferably done by conventional means such as welding, as indicated at 32. Preferably, in order to ensure a structural load path through the elongated tubular configuration 26, a continuous weld is utilized to secure the adjacent edges 18b and 18c of the bottom wall 18a in integral load-bearing relationship.

As will be appreciated by referring to FIG. 3, the hollow metal tube 12 is generally trapezoidal in cross-section with the bottom wall 18 being slightly greater in width than the top wall 20 and the side walls 22 and 24 converging slightly from the inner heat exchanging surface 18a to the outer heat exchanging 20a. In this manner, the elongated tubular configuration 26 can be easily formed by helically winding the hollow metal tube 12 such that the adjacent side walls 22 and 24 automatically form the narrow generally V-shaped helically extending gap 28 thereafter filled with the compliant filler material 30 to accommodate thermal growth, as previously discussed.

Figure 4:
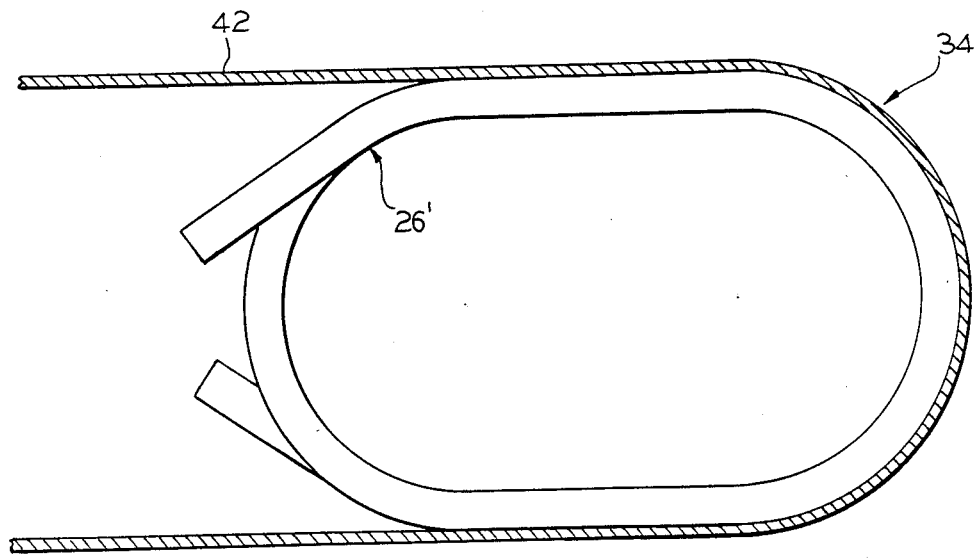
FIG. 4 is an end elevational view, partially in section, illustrating an aircraft leading edge similar to FIG. 1.

As will be appreciated, the elongated tubular configuration 26 illustrated in FIGS. 1 through 3 is formed so as to be generally cylindrical. It may also be advantageous for the elongated tubular configuration 26 to take other forms such as the generally oblong elongated tubular configuration 26' illustrated in FIG. 4. Further, the elongated tubular configurations 26 and 26' are merely representative of the many possible forms of the structural leading edge cooling unit.

Figure 5:
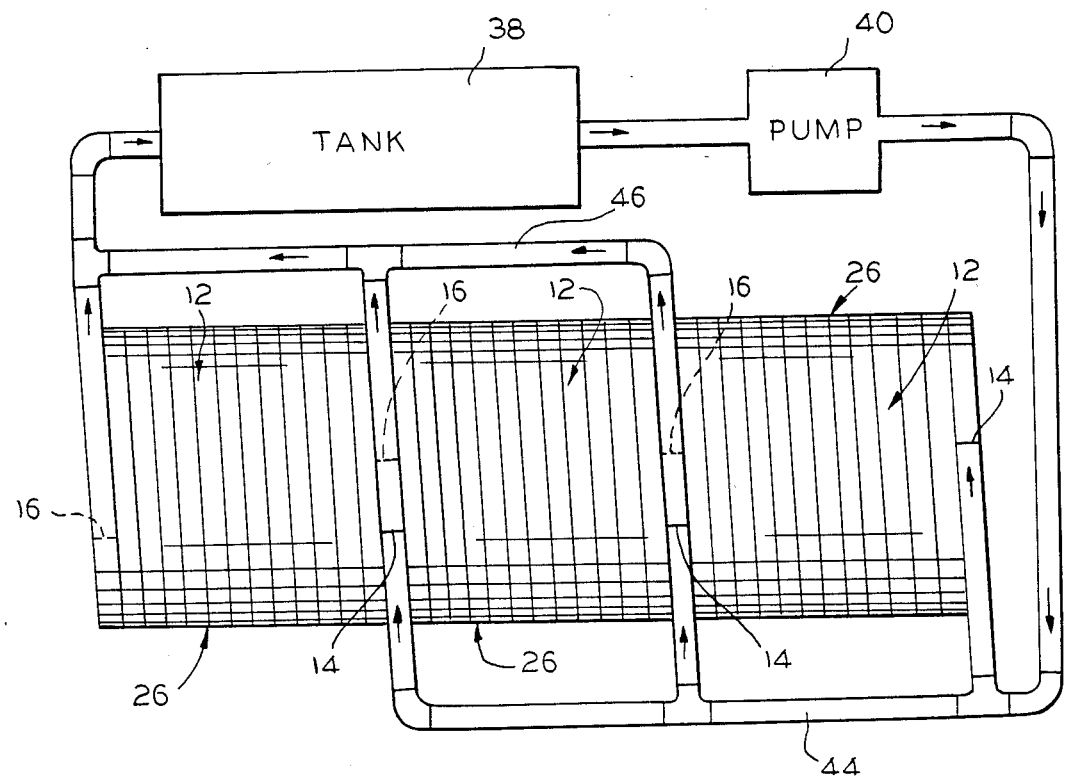
FIG. 5 is a schematic view illustrating an active structural cooling unit system for an aircraft leading edge in accordance with the present invention.

Referring now to FIGS. 1 through 3 taken with FIG. 5, an aircraft leading edge 34 is illustrated in the drawings. It will be appreciated that, in accordance with the present invention, the cooling unit 10 is an active, structural cooling unit wherein the spaced generally parallel bottom and top walls 18 and 20, respectively, which are joined by the pair of spaced side walls 22 and 24, together define a coolant flow channel 36 therebetween. Also, as best shown in FIG. 1, the inlet 14 is disposed at one end and the outlet 16 is disposed at the other end of the elongated tubular configuration 26.

Referring specifically to FIGS. 1 and 2, the coolant flow channel 36 extends helically between the inlet 14 and the outlet 16. It will also be appreciated by referring to FIG. 5 that a tank 38 is provided as a part of the active structural cooling unit 10 for storing coolant in close proximity to the inlet 14 and outlet 16. In addition, means are provided for circulating coolant from the tank 38 to the inlet 14, through the coolant flow channel 36, and from the outlet 16 back to the tank 38.

In the preferred embodiment, the coolant circulating means is a pump 40 in the path of flow of coolant through the active structural cooling unit 10. While the pump 40 has been shown on the inlet side of the coolant unit 10, it will be appreciated that this is merely representative, and should not be construed as limiting. In addition, depending upon the amount of loss of coolant, it may be possible to eliminate the tank 38 in favor of a closed coolant system.

As best shown in FIG. 2, the aircraft leading edge 34 includes an external skin 42 covering the elongated tubular configuration 26. The external skin 42, which may be conventional for the type of aircraft involved, is, as shown, disposed in heat exchange relationship with the elongated tubular configuration 26. Still more particularly, the external skin 42 is disposed in heat exchange relationship with the outer heat exchanging surface 20a, i.e., preferably in intimate contact with the surface 20a.

Referring now to FIG. 5, the aircraft leading edge 34 preferably includes a plurality of active structural cooling units 10. These are, in turn, made up of a plurality of elongated tubular configurations 26 or 26' defined by the helically wound metal tubes 12, and each of the helically wound metal tubes 12 again have an inlet 14 and an outlet 16 at opposite ends thereof. With this arrangement, the elongated tubular configurations 26 or 26' defined by the helically wound metal tubes 12 are disposed in longitudinally extending adjacent relationship, substantially as shown.

Also as shown, the inlet 14 of any one of the helically wound metal tubes 12 is disposed at the end thereof closest the outlet 16 of the next adjacent of the helically wound metal tubes 12. This arrangement facilitates utilization of an inlet header 44 in communication with tank 38 and each of the inlets 14 and utilization of an outlet header 46 in communication with the tank 38 and each of the outlets 16. In order to form a structural load path through all of the elongated tubular configurations 26, means are provided for securing each of the elongated tubular configurations 26 to the next adjacent of the elongated tubular configurations 26 in integral relationship, preferably by welding.

While described as trapezoidal in cross-section, it will be appreciated that the hollow metal tube 12 is very nearly square walled. It does, however, have slightly tapered side walls 22 and 24 but, in the generally square walled configuration utilized, the hollow metal tube 12 is highly suitable as a vaporization cooled leading edge for hypersonic vehicles such as aircraft. As should be clear from the description hereinabove, the hollow metal tube 12 is tightly helically wound with adjacent edges 18b and 18c of the bottom wall 18 in abutting relationship for forming a continuous inner heat exchanging surface 18a.

By welding the abutting edges 18b and 18c of the bottom wall 18 the elongated tubular configuration 26 has a continuous cylindrical inner surface forming a highly effective structural load path therealong. It will also be appreciated that the hollow metal tube 12 is preferably preformed to have the trapezodal cross-section giving the narrow helically extending V-shaped gap 28 opening at the outer heat exchanging surface 20a, i.e., insuring that the space between adjacent side walls 22 and 24 is actually a slight taper, which has been exaggerated in FIG. 3 for purposes of illustration. With regard to the compliant filler material 30, the narrow helically extending V-shaped gap 28 can be filled with a flexible material such as a high temperature RTV.

With the structure described in detail, together with the compliant filler material 30 and the narrow helically extending V-shaped gap 28, thermal growth is clearly allowed. This thermal growth occurs most significantly in the portion of the elongated tubular configuration 26 facing the aerodynamic heating, i.e., the portion at or adjacent the outer heat exchanging surface 20a in heat exchange relationship with the external skin 42 of the leading edge 34, and this occurs without physically locking up and transmitting thermal bending loads into the aircraft or vehicle. Moreover, the fact that the path of flow of coolant is helical makes the structure insensitive to variations in angle of attack.

More particularly, the helical flow path is advantageous because all of the mass flow of coolant is presented equally to all sections of the cooling unit or units 10. This occurs even though there may well be a variation in liquid quality from the inlet 14 to the outlet 16. It will also be appreciated that the helical flow structure would inherently be capable of providing a liquid film on the surface even at very high qualities. This is to be contrasted with two-phase flow in straight pipes or channels which are usually limited to 20 to 30 percent quality at which point film boiling occurs. In applications involving hypersonic aircraft and the like, film boiling must be avoided because the heat fluxes are otherwise so high that equilibrium temperatures are encountered that could result in destruction of the tube material.

As will also be appreciated, the helical flow structure has an inherently high self-generated centrifugal field. This will keep the liquid coolant on the leading edge 34 under all acceleration or deceleration maneuvers that the aircraft or vehicle goes through. Once again, this is in contrast to straight pipe or channel flow which has no inherent mechanism to assure coolant on the proper wall under all conditions.

As described hereinabove, a total leading edge structure can be fabricated by axially welding together relatively small sections of structural leading edge cooling units 10. Each structural leading edge cooling unit 10 can, for instance, be approximately one to two feet in length and, thus, would be a separate heat exchanger with its own inlet 14 and outlet 16, typically utilizing ⅛ inch to ½ inch square walled tubing helically wound to a diameter of approximately four to six inches. In this fashion, it would also be possible for coolant flows to be tailored to match the spanwise variation and heating intensity on the leading edge 34.

In a general sense, the structural cooling unit 10 comprises a load bearing structure of hollow construction defining a fluid flow path 36 therethrough. The load bearing structure 10 has a fluid inlet 14 at one end of the fluid flow path 36 and a fluid outlet 16 at the other end of the fluid flow path 36 and is formed into an elongated tubular configuration 26 having at least one substantially continuous heat exchanging surface 18a. Further, the fluid flow path 36 comprises a tortuous path through the load bearing structure 10.

In an alternative embodiment (see FIG. 6), the load bearing structure 10 is defined by at least two hollow metal tubes 12 and 12' each having spaced generally parallel bottom and top walls 18,18' and 20,20' joined by a pair of spaced side walls 22,22' and 24,24'. The hollow metal tubes 12 and 12' are helically wound in side-by-side relation into the elongated tubular configuration 26 to have an inner surface defined by the bottom walls 18 and 18' forming the substantially continuous heat exchanging surface. Further, the hollow metal tubes 12 and 12' each define a fluid flow path 36 and 36' therethrough and each have a fluid inlet 14 and 14' at one end thereof and a fluid outlet 16 and 16' at the other end thereof.

Figure 6:
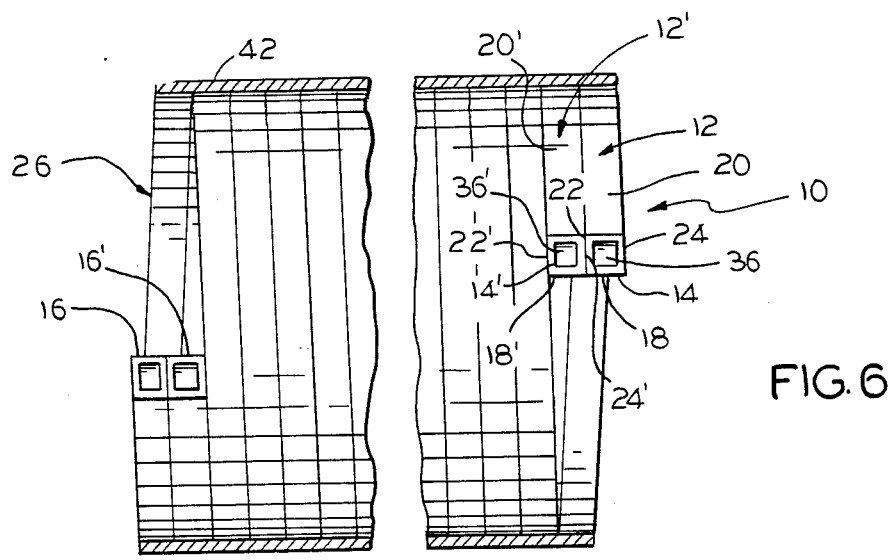
FIG. 6 is a rear elevational view, partially in section, of an alternative embodiment of active structural cooling unit in accordance with the present invention.

As will be appreciated by referring to FIG. 6, the respective fluid inlets 14 and 14' and fluid outlets 16 and 16' are immediately adjacent. It will be appreciated, of course, that it may be desirable to have the fluid inlet 14 of one of the hollow metal tubes 12 immediately adjacent the fluid outlet 16' of the other of the hollow metal tubes 12'. In so doing, it is possible not only to provide cooling redundancy but also to achieve high cooling efficiency.

Figure 7:
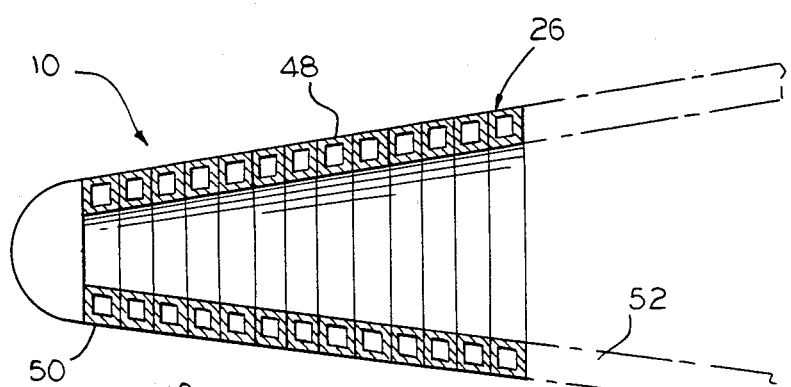
FIG. 7 is a cross-sectional view of an aircraft nose cone having an active structural cooling unit in accordance with the present invention.

Referring now to FIG. 7, the cooling unit 10 can be utilized in conjunction with a nose cone 48. In this embodiment, the cooling unit 10 will be formed such that the elongated tubular configuration 26 has a first diameter at one end 50 and a second, larger diameter at the other end 52. As a result, the elongated tubular configuration 26 is generally frustoconically shaped to fit in the nose cone 48.

Figure 8:
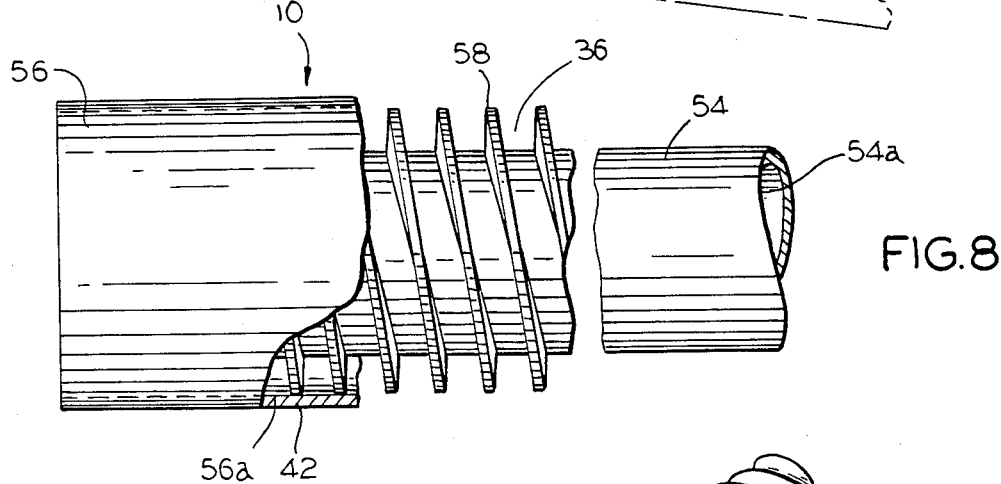
FIG. 8 is a rear elevational view, partially in section, of another alternative embodiment of active structural cooling unit in accordance with the present invention.

Still another embodiment is illustrated in FIG. 8. It will be seen that the cooling unit 10 is a load bearing structure which includes a pair of concentric hollow metal tubes 54 and 56 disposed in radially spaced relation to define inner and outer heat exchanging surfaces 54a and 56a. Also, as shown in FIG. 8, the cooling unit 10 includes a helical vane 58 extending between the hollow metal tubes 54 and 56 to define the fluid flow path 36.

Figure 9:
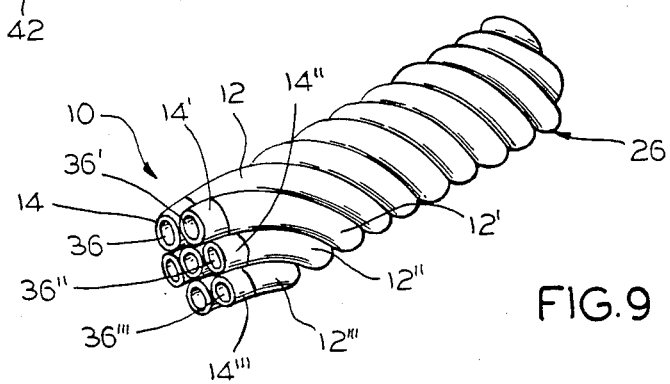
FIG. 9 is a perspective view of still another active structural cooling unit in accordance with the present invention.

Still another embodiment is illustrated in FIG. 9. The cooling unit 10 in this instance is a load bearing structure which includes a plurality of hollow metal tubes 12,12',12'',12''', etc., each having a fluid flow path 36, 36',36'',36''', etc. and having respective fluid inlets 14,14',14'',14''', etc. at one end thereof and corresponding fluid outlets at the other end thereof. As shown, the hollow metal tubes 12,12',12'',12''', etc. are twisted in corkscrew fashion to define the elongated tubular configuration 26.

While in the foregoing there has been set forth preferred embodiments of the invention, it is to be understood that the invention is only to be limited by the spirit and scope of the appended claims.

I claim:

1. A structural cooling unit, comprising:
a load bearing structure of hollow construction defining a fluid flow path therethrough, said load bearing structure having a fluid inlet at one end of said fluid flow path and a fluid outlet at the other end of said fluid flow path and being formed into an elongated tubular configuration having at least one substantially continuous heat exchanging surface, said fluid flow path comprising a tortuous path through said load bearing structure;
said load bearing structure being defined by at least two hollow metal tubes each having spaced generally parallel bottom and top walls joined by a pair of spaced side wall, said hollow metal tubes being helically wound in side-by-side relation into said elongated tubular configuration to have an inner surface defined by said bottom walls forming said substantially continuous heat exchanging surface;

each of said hollow metal tubes defining a fluid flow path therethrough, said hollow metal tubes each having a fluid inlet at one end thereof and a fluid outlet at the other end thereof.

2. The structural cooling unit as defined by claim 1 wherein said load bearing structure is defined by a hollow metal tube having spaced generally parallel bottom and top walls joined by a pair of spaced side walls, said hollow metal tube being helically wound into said elongated tubular configuration to have an inner surface defined by said bottom wall forming said substantially continuous heat exchanging surface.

3. The structural cooling unit as defined by claim 2 wherein said helically wound metal tube has a substantially continuous outer heat exchanging surface defined by said top wall, said top wall having adjacent edges in slightly spaced relationship, said helically wound metal tube being formed with said side walls slightly tapering from said bottom wall to said top wall to define a narrow helically extending V-shaped gap therebetween.

4. The structural cooling unit as defined by claim 1 wherein said elongated tubular configuration has a first diameter at one end and a second diameter at the other end, said elongated tubular configuration being generally frustoconically shaped for a nose cone.

5. The structural cooling unit as defined by claim 1 wherein said load bearing structure includes a plurality of hollow metal tubes, said hollow metal tubes each having a fluid flow path therethrough and having a fluid inlet at one end of said fluid flow path and a fluid outlet at the other end of said fluid flow path, said hollow metal tubes being twisted in corkscrew fashion to define said elongated tubular configuration.

6. A structural cooling unit, comprising:

a hollow metal tube having an inlet at one end and an outlet at the other end, said hollow metal tube being defined by spaced generally parallel bottom and top walls joined by a pair of spaced side walls, said hollow metal tube being helically wound into an elongated tubular configuration;

said helically wound metal tube having a substantially continuous outer heat exchanging surface defined by said top wall with adjacent edges of said top wall being in slightly spaced relationship, said helically wound metal tube also having a continuous inner heat exchanging surface defined by said bottom wall and having adjacent edges of said bottom in abutting relationship;

said hollow metal tube being formed with said side walls slightly tapering from said bottom wall to said top wall such that adjacent side walls define a narrow helically extending V-shaped gap between said inner heat exchanging surface and said outer heat exchanging surface in said helically wound metal tube; and means for securing said adjacent edges of said bottom wall in integral relationship.

7. The structural cooling unit as defined by claim 6 including a compliant filler material in said narrow helically extending V-shaped gap in said helically wound metal tube, said complaint filler material accommodating thermal growth during heating of said outer heat exchanging surface of said helically wound metal tube.

8. The structural cooling unit as defined by claim 7 wherein said means for securing said adjacent edges of said bottom wall in integral relationship is welding.

9. The structural cooling unit as defined by claim 5 wherein said hollow metal tube is generally trapezoidal in cross-section with said bottom wall being slightly greater in width than said top wall and said side walls converging slightly from said inner heat exchanging surface to said outer heat exchanging surface of said helically wound metal tube.

10. The structural cooling unit as defined by claim 9 wherein said helically wound metal tube is formed such that adjacent side walls define a narrow helically extending V-shaped gap therebetween.

11. The structural cooling unit as defined by claim 10 wherein said means for securing said adjacent edges of said bottom wall is welding and including a compliant filler material in said narrow helically extending V-shaped gap.

12. The structural cooling unit as defined by claim 6 wherein said elongated tubular configuration into which said hollow metal tube is helically wound is generally cylindrical.

13. The structural leading edge cooling unit as defined by claim 6 wherein said elongated tubular configuration into which said hollow metal tube is helically wound is generally oblong.

14. An aircraft leading edge having an active structural cooling unit, comprising:

a plurality of hollow metal tubes having an inlet at one end and an outlet at the other end, said hollow metal tubes each being defined by spaced generally parallel bottom and top walls joined by a pair of spaced side walls to define a coolant flow channel, said hollow metal tubes each being helically wound into an elongated tubular configuration;

said helically wound metal tubes being disposed in longitudinally extending adjacent relationship and having a continuous inner heat exchanging surface defined by said bottom wall and having adjacent edges of said bottom wall in abutting relationship;

said inlets being disposed at one end of said elongated tubular configuration and said outlets being disposed at the other end of said elongated tubular configuration;

said coolant flow channels extending helically between said inlets and said outlets;

means for securing said adjacent edges of said bottom walls in integral relationship to form a structural load path through said elongated tubular configuration;

a tank for storing coolant in close proximity to said inlets and outlets;

means for circulating coolant from said tank to said inlets, through said coolant flow channels, and from said outlets back to said tank; and an external skin covering said elongated tubular configuration in heat exchange relationship therewith.

15. The aircraft leading edge as defined by claim 14 wherein said inlet of any one of said helically wound metal tubes is disposed at the end thereof closest said outlet of the next adjacent of said helically wound metal 16. The aircraft leading edge as defined by claim 15 including an inlet header in communication with said tank and each of said inlets and an outlet header in communication with said tank and each of said outlets.

17. The aircraft leading edge as defined by claim 15 including means for securing each of said helically wound metal tubes to the next adjacent of said helically wound metal tubes.

18. The aircraft leading edge as defined by claim 14 wherein said coolant circulating means is a pump in communication with said tank and said coolant flow channel.

19. An aircraft leading edge having an active structural cooling unit, comprising:
a plurality of hollow metal tubes having an inlet at one end and an outlet at the other end, said hollow metal tubes each being defined by spaced generally parallel bottom and top walls joined by a pair of spaced side walls to define a coolant flow channel, said hollow metal tubes each being helically wound into an elongated tubular configuration;
said helically wound metal tubes each having a continuous inner heat exchanging surface defined by said bottom wall and each having adjacent edges of said bottom wall in abutting relationship;
said inlets each being disposed at one end of the respective ones of said elongated tubular configuration and said outlets each being disposed at the other end of the respective ones of said elongated tubular configurations;
said inlet of any one of said helically wound metal tubes being disposed at the end thereof closest said outlet of the next adjacent of said helically wound metal tubes;
said coolant flow channels extending helically between the respective ones of said inlets and said outlets;
means for securing said adjacent edges of said bottom walls in integral relationships to form a structural load path through each of said elongated tubular configurations;
a tank for storing coolant in close proximity to said inlets and outlets;
means for circulating coolant from said tank to said inlets, through said coolant flow channels, and from means being a pump in communication with said tank and said coolant flow channels; and
an external skin covering said elongated tubular configurations in heat exchange relationship therewith.

20. The aircraft leading edge as defined by claim 19 including means for securing each of said elongated tubular configurations to the next adjacent of said elongated tubular configurations.

21. The aircraft leading edge as defined by claim 19 wherein said coolant circulating means includes an inlet header in communication with said tank and each of said inlets and an outlet header in communication with said tank and each of said outlets.

22. The aircraft leading edge as defined by claim 19 wherein said elongated tubular configurations each have a substantially continuous outer heat exchanging surface defined by said top wall and have adjacent edges of said top wall in slightly spaced relationship.

23. The aircraft leading edge as defined by claim 22 wherein said elongated tubular configurations are each formed with said side walls tapering from said bottom wall to said top wall such that adjacent side walls define a narrow helically extending V-shaped gap between said inner heat exchanging surface and said outer heat exchanging surface in said helically wound metal tube.

24. The aircraft leading edge as defined by claim 23 including a compliant filler material in said narrow helically extending V-shaped gaps in said elongated tubular configurations, said compliant filler material accommodating thermal growth during heating of said outer heat exchanging surfaces of said elongated tubular configurations.

25. The aircraft leading edge as defined by claim 20 wherein said means for securing said adjacent edges of said bottom walls in integral relationship is welding and wherein said means for securing each of said elongated tubular configurations to the next adjacent of said elongated tubular configurations is welding.

* * * * *